Jan. 7, 1936. H. H. PEARL 2,026,700
UTENSIL COVER
Filed June 26, 1933 2 Sheets-Sheet 1

INVENTOR
Herman H. Pearl
BY
his ATTORNEY

Jan. 7, 1936.                H. H. PEARL                2,026,700
                             UTENSIL COVER
                      Filed June 26, 1933        2 Sheets-Sheet 2
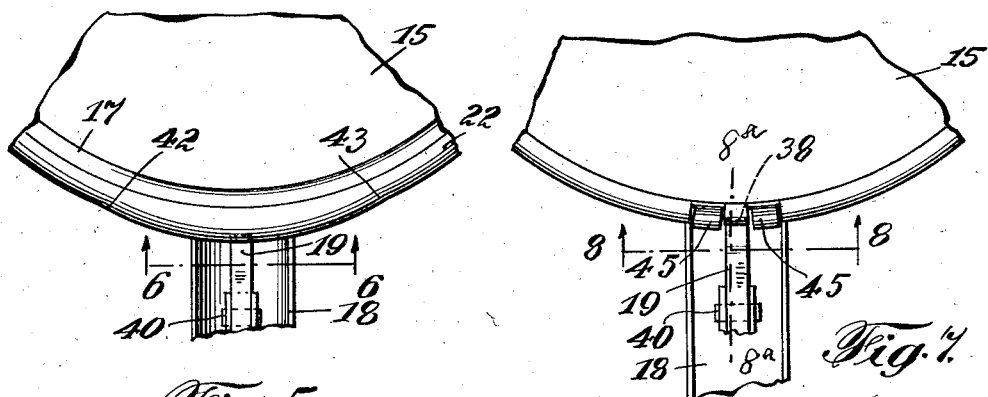
Fig. 5.              Fig. 7.
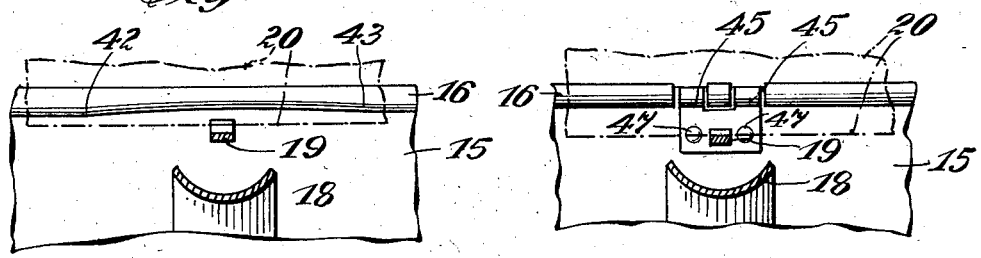
Fig. 6.          Fig. 8.
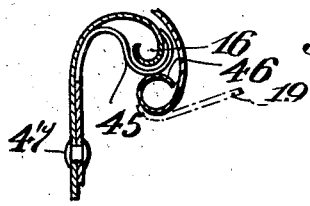
Fig. 8ª
INVENTOR
Herman H. Pearl
BY
his ATTORNEY Patented Jan. 7, 1936

2,026,700

UNITED STATES PATENT OFFICE 2,026,700

UTENSIL COVER

Herman H. Pearl, Garden City, N. Y.

Application June 26, 1933, Serial No. 677,643

6 Claims. (Cl. 53—1)

This invention relates to utensil covers and releasing means therefor, and has for its primary object and purpose to provide a cover for pots and other vessels or containers provided with means whereby said cover may be easily applied to securely close the open end of the vessel together with simple and easily operable means mounted on the handle of the vessel for effecting the release of the cover in order to permit of its easy removal.

It is a more particular object of the invention to provide a vessel having an open portion provided with sections of different diameters to be used with covers of the same diameter, whereby a good fitting of vessel and cover may be obtained.

A further object is to provide a cover knob holder, which provides a secure means avoiding the getting loose of the knob as is very frequently the case.

The invention consists in the improved cover holding means, and embodiment thereof will be more fully described hereinafter and finally pointed out in the claims.

In the drawings,

Figure 5 is a plan view, without cover, showing a circular vessel which is provided with a part of different diameter;

Figure 6 is a section taken on line 6—6 of Figure 5;

Figure 7 is a plan view of another form of vessel;

Figure 8 is a section taken on line 8—8 of Figure 7;

Figure 8a is a section taken on line 8a—8a of Figure 7;

Similar reference characters indicate corresponding parts throughout the various views.

Figure 1:
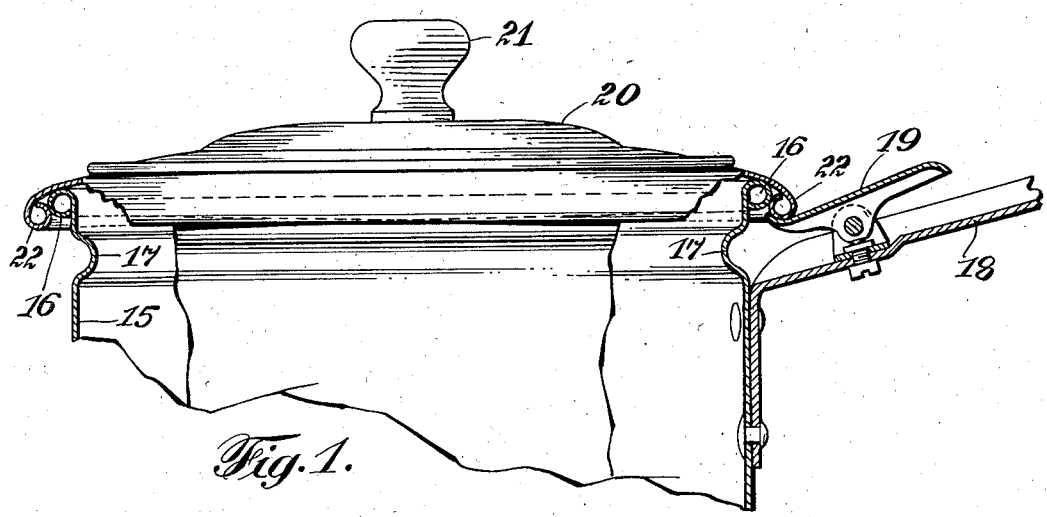
Figure 1 is a side view partly in sections of a vessel with cover thereon.

Referring to the drawings, and more particularly to Figures 1 to 4, the vessel 15 has a bead 16, which extends around the circumference of the open part of the vessel. The vessel is also provided with a circumferential channel portion 17. At one side of the vessel, a handle 18 having a pivoted lever 19 is provided. A cover 20, having a knob 21, has a circumferential bead 22, adapted to engage the circumferential bead 22 of the vessel. The bead 22 of the cover is adapted to be engaged by the end of the lever 19, and pressure applied to one end of the pivoted lever, causes the other end of the lever to press against the bead 22 of the cover and to raise it off the vessel.

The circumference of the bead 22 of the cover, and thus the cover itself is circular and substantially of the same diameter within the limits of manufacturing requirements. The circumference of the bead 22 of the vessel is circular but of different diameters, or of different points of curvature, and the opposed diametrical portions are of the same diameter, though the opposed diametrical portions, at right angles thereto are of different diameters. So, in Figure 2, the portions 30 to 31, are of the same curvature, whereas the portions 32 to 33 are of different curvature. In any case, the curvature of the vessel is of different curvature, at that part of the vessel where the cover embraces it, and where the handle extends from the vessel as is seen from Figure 3. This difference in curvature brings about a secure hold between vessel and cover, since in order to fit the uneven vessel into the evenly curved cover, the larger diameters of the vessel are compressed towards each other, and the smaller diameters of the vessel are flared away from each other, and this disposition of the parts causes them to be tightly held by the circular cover. This part of the invention includes then the cover and vessel openings of different diameters, whereby the compression and extension of the parts in respect to each other bring about a secure hold.

Figures 2, 4:
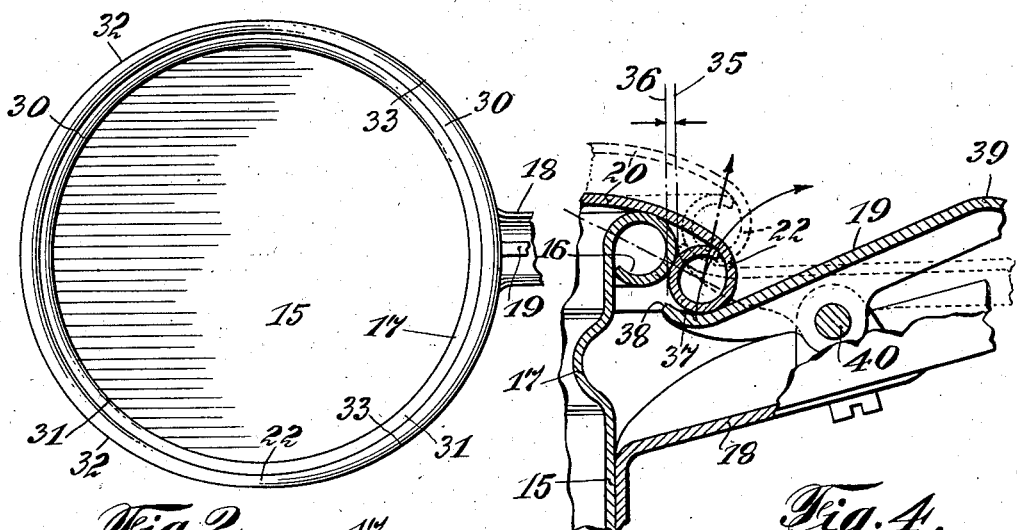
Figure 2 is a plan view of the vessel, with cover removed therefrom, showing the diameter of the vessel to be larger in one direction than in another.
Figure 4 is a section showing the beads and part of the handle in enlarged size, to show their cooperation.
Figure 3:
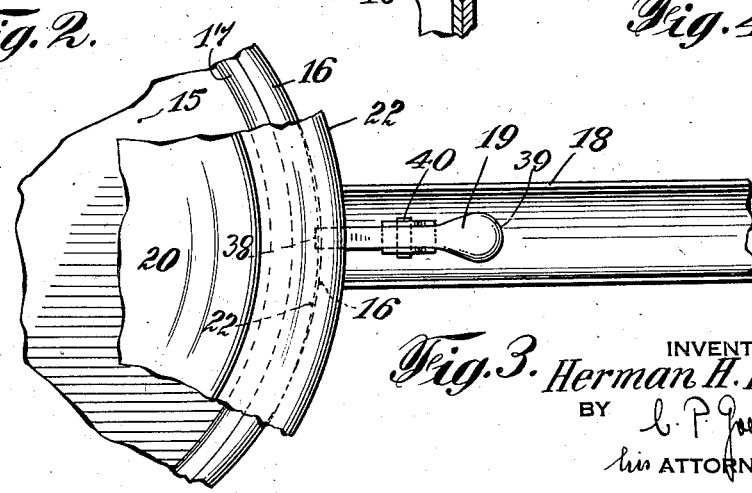
Figure 3 is a partial top view with the cover attached and showing the eccentricity of the vessel and cover, in which the cover is of the same diameter, and the vessel has different diameters.

Another part of the invention consists in the proper relationship of the cover and vessel beads in respect to each other. This is shown in Figure 4. The bead 16 of the vessel is closely adjacent to the flanged portion 17, and the outermost peripheral portion of the bead 16 is shown by the line 35. The innermost portion of the bead 22 is shown by the line 36. These lines 35 and 36 are vertical tangents to the respective beads, and the beads contact on line tangential to both beads which is at an angle to the vertical tangents. The end of the lever is provided with a curved portion of a curvature substantially equal to the curve of the bead of the cover, and this curved portion is the tip end of the lever, shown by 37 to 38. When the beads are engaged as shown, the lever at 37 to 38, is free of the bead 22. When, however, the end 39 of the lever 19 is pressed downwardly, and around the pivot 40, then the bead 22 must be moved out of engagement with the bead 16, and overcome the relationship show, wherein the bead 22 is below the bead 16, and laterally inwards to the extent of the distance between the vertical lines 35 and 36. To accomplish this the end 37 of the lever presses upon the lower rim of the bead 22, until the curved part 37—38 gradually becomes concentric with the bead 22, as shown in dotted lines, and as this takes place, the bead 22 is moved by the force exerted by the lever, away from the vertical 36, and in fact beyond the vertical 35, until it is entirely free of the bead 16, as shown in dotted lines. This action requires an expansion of the metal of the cover to some extent, but it is due to the relationship of the curved end of the lever acting against a certain position of the bead, and the position of the beads relative to each other that the engagement of the beads and their disengagement take place. The placing of the bead 16 upon the end of the flanged portion 17 of the vessel, also gives an added function to the parts, as it gives to the bead 16 a certain rigidity and yet flexibility to enable the parts to move relative to each other upon operating the lever.

These actions can take place when the vessel is curved as shown in Figure 2, or when the vessel is provided with a curved portion 42 to 43, as shown in Figure 5, this curvature having a different curvature than the rest of the circumference of the vessel. In this case, such curvature would be seen also when viewed in the direction of the arrows 6—6, as clearly seen in Fig. 5. This oval portion 42—43 in the vessel is placed where the handle 18 is attached to the vessel. A slot 43a is provided in the body of the vessel to permit the end of the lever 19 to pass therethrough, to engage the cover.

In cases where the vessel and cover are of enamel ware it will not do to expand either the cover or the vessel as chipping would result, and so in the embodiment of Figs. 7, 8, and 8a, the vessel, as also the cover are circular in circumference. An expansion device is, however, applied to the vessel to engage the cover. This consists in recessing the bead 16 of the vessel preferably at two places, and placing therein two flat springs 45, shaped as shown in Fig. 8a to engage the inner part 46 of the cover immediately above the bead 22. The springs are attached at 47 to the vessel, and extend normally beyond the periphery of the rim of the same. The cover then compresses these wings of the springs and this compression permits the cover to pass over the springs. Then after compression, the springs expand and lock the cover in place.

It will be noted that there are means on the free edges of diametrically opposite sections adapted to cooperate with the cylindrical bead on the upper edge of the other member to expand the flange sections outwardly and simultaneously inwardly contract the intervening sections, whereby said means is retained in interlocking engagement when the said flange sections resume a normal relation. The variable diametric dimensions with an outward and inward expansion at various parts serve to lock the parts together.

From the foregoing description considered in connection with the accompanying drawings, the construction, manner of use and several advantages of my present invention will be clearly and fully understood. It will be seen that I have devised an improved cover holding or retaining means for cooking utensils and other vessels which enables the cover to be easily and quickly applied without great manual effort and also easily removed, while at the same time an effective sealing or closure of the vessel is obtained. It will be understood that the particular form of the vessel or the relative diameters of the cooperating beads on the vessel body and its cover, are not essential and that my invention may be advantageously used in connection with receptacles or containers employed for a great variety of different purposes. Therefore, is to be understood, although I have herein shown and described one simple and practical embodiment of my present improvements, that the essential features thereof may also be incorporated in other various alternative mechanical structures, and I, therefore, reserve the privilege of resorting to all such legitimate changes therein as may be fairly embodied within the spirit and scope of the invention as claimed.

I claim:—

1. A culinary container comprising a vessel and a cover, a bead on the cover, a bead on the vessel, the vessel bead having a recess, a spring plate within said recess extending normally beyond the vessel bead and adapted to be pressed inwardly of the vessel bead by the cover bead when the same is applied to the vessel, said spring plate being adapted to engage the inner part of the cover bead when the cover has been applied to the vessel.

2. A culinary container comprising a vessel and a cover, a bead on the cover, a bead on the vessel, the vessel bead having a recess, a spring plate within said recess extending normally beyond the vessel bead and adapted to be pressed inwardly of the vessel bead by the cover bead when the same is applied to the vessel, said spring plate being adapted to engage the inner part of the cover bead when the cover has been applied to the vessel, a handle for the vessel and a pivoted member on the handle having a curvature in coincidence with the curvature of the cover bead.

3. A culinary container comprising a vessel part and a cover part adapted to be yieldably and releasably mounted on the vessel part, each of said parts having marginal beads and at least one of said beads being substantially elliptical in plan and being conformable substantially to the configuration of the other bead when the parts are in contact with each other.

4. A culinary container comprising a vessel part and a cover part adapted to be yieldably and releasably mounted on the vessel part, each of said parts having marginal beads and at least one of said beads being substantially elliptical in plan and being conformable substantially to the configuration of the other bead when the parts are in contact with each other, and releasing means carried by one of said parts and engageable with the other part to separate the parts.

5. A culinary container comprising a vessel part and a cover part adapted to be yieldably and releasably mounted on the vessel part, each of said parts having marginal beads and the bead of the vessel part being substantially elliptical in plan and being conformable substantially to the configuration of the cover bead when the parts are in contact with each other.

6. A culinary container comprising a vessel part and a cover part adapted to be yieldably and releasably mounted on the vessel part, each of said parts having marginal beads and the bead of the vessel part being substantially elliptical in plan and being conformable substantially to the configuration of the cover bead when the parts are in contact with each other, the cover bead having an upwardly offset portion for a portion of its circumference, and a releasing means carried by the vessel part and engageable with said offset portion to release the cover part from the vessel part.

HERMAN H. PEARL.